(12) United States Patent
Choi

(10) Patent No.: US 7,033,051 B2
(45) Date of Patent: Apr. 25, 2006

(54) INFRARED RAY IRRADIATION APPARATUS FOR NIGHT VISION SYSTEM

(75) Inventor: Jang-Don Choi, Tokyo (JP)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 10/749,238

(22) Filed: Dec. 30, 2003

(65) Prior Publication Data

US 2004/0252368 A1   Dec. 16, 2004

(30) Foreign Application Priority Data

Jun. 11, 2003   (KR)   ...................... 10-2003-0037524

(51) Int. Cl.
*F21V 11/00*   (2006.01)
(52) U.S. Cl. ........................ 362/508; 362/293; 362/510
(58) Field of Classification Search ................ 362/510, 362/508, 293
See application file for complete search history.

(56) References Cited

U.S. PATENT DOCUMENTS

| | | | | |
|---|---|---|---|---|
| 5,047,902 A | * | 9/1991 | Neumann et al. | ............ 362/508 |
| 2001/0019482 A1 | | 9/2001 | Kobayashi et al. | ......... 362/510 |
| 2001/0050344 A1 | | 12/2001 | Albou | ........................ 250/504 |
| 2002/0154513 A1 | | 10/2002 | Yagi et al. | ................... 362/510 |
| 2003/0076688 A1 | | 4/2003 | Kobayashi | ................... 362/510 |

* cited by examiner

*Primary Examiner*—Sandra O'Shea
*Assistant Examiner*—Meghan Dunwiddie
(74) *Attorney, Agent, or Firm*—Morgan Lewis & Bockius LLP

(57) ABSTRACT

An infrared ray irradiation apparatus for a night vision system which is operated easily and selectively in a visible and infrared ray irradiation mode and an infrared ray irradiation mode, and irradiates infrared rays emitted from a lamp toward an area in front of a car by means of one transmission step (by a tube) and one reflection step (by a reflector), thus irradiating the infrared rays without deterioration in brightness.

2 Claims, 2 Drawing Sheets

INFRARED RAY IRRADIATION APPARATUS FOR NIGHT VISION SYSTEM

CROSS-REFERENCE TO RELATED APPLICATIONS

This application claims priority of Korean Application No. 10-2003-0037524, filed on Jun. 11, 2003, the disclosure of which is incorporated fully herein by reference.

FIELD OF THE INVENTION

The present invention relates to a night vision system assisting a driver in securing a visual field at night and, more particularly, to a mechanism of irradiating infrared rays.

BACKGROUND OF THE INVENTION

Generally, a night vision system has a mechanism of irradiating infrared rays on a target object, allowing a camera to sense infrared rays reflected by the object and then display the obtained data to a driver.

Such a night vision system comprises an infrared irradiation apparatus for irradiating infrared rays to a target object. An important factor for having an effective night vision system is suitable irradiation of infrared rays having a designated brightness.

SUMMARY OF THE INVENTION

The present invention provides an infrared ray irradiation apparatus for a night vision system, which is operated selectively and easily in a visible and infrared ray irradiation mode and an infrared ray irradiation mode, and irradiates infrared rays emitted from a lamp without deterioration in brightness.

In accordance with a preferred embodiment of the present invention, an infrared ray irradiation apparatus for a night vision system apparatus comprises a lamp and a rectilinear actuator for rectilinearly moving the lamp. A tube is made of a transparent material and extended at a designated length for receiving the rectilinearly moving lamp. A reflector surrounds the tube from one end of the tube along a rectilinear direction in which the lamp is inserted into the tube. An infrared ray transmitting filter is installed at a designated portion of the tube for shielding the lamp from the reflector.

In accordance with another embodiment of the present invention, an infrared ray irradiation apparatus for a night vision system apparatus comprises a lamp and a rectilinear actuator for rectilinearly moving the lamp. A tube is made of a transparent material and extended at a designated length for receiving the rectilinearly moving lamp. A reflector surrounds the tube from one end of the tube along a rectilinear direction in which the lamp is inserted into the tube, wherein the reflector includes an infrared ray reflecting filter, in which visible rays are passed through and infrared rays are reflected, installed at a designated position.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The preferred embodiments of the present invention will now be described in detail with reference to the annexed drawings.

Figure 1:
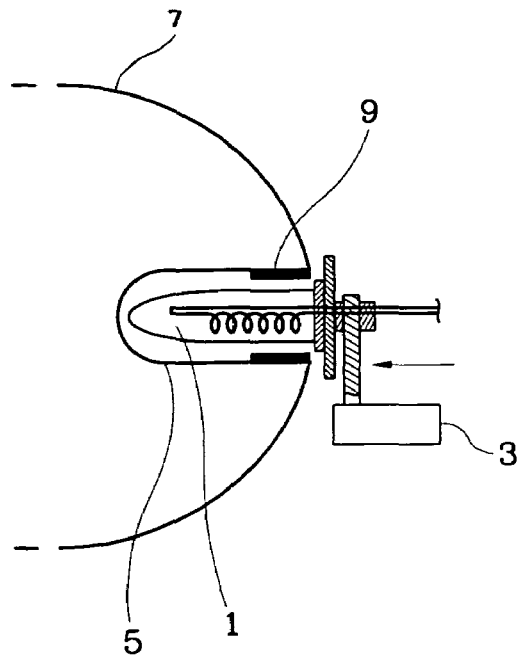
FIG. 1 is a schematic side view illustrating the constitution of an infrared ray irradiation apparatus in accordance with one embodiment of the present invention.
Figure 2:
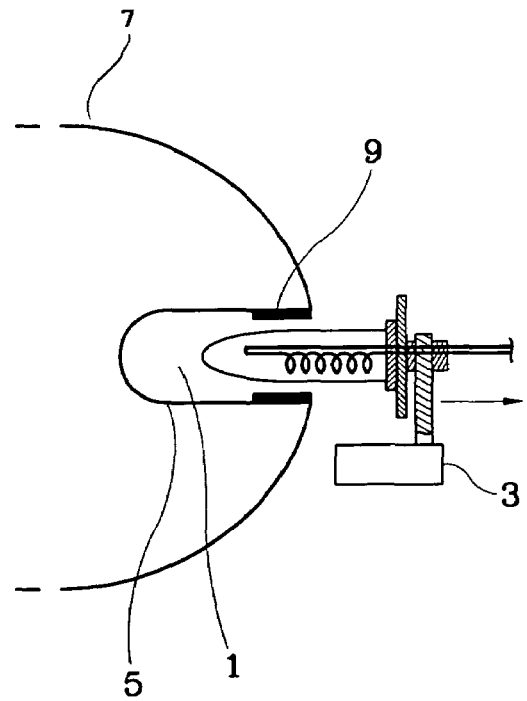
FIG. 2 is a schematic side view illustrating operation of an infrared ray irradiation apparatus in accordance with one embodiment of the present invention.

As shown in FIGS. 1 and 2, the infrared ray irradiation apparatus comprises a lamp 1, a rectilinear actuator 3 for rectilinearly moving the lamp 1, a tube 5 made of a transparent material and extending at a designated length for receiving the rectilinearly moving lamp 1, a reflector 7 surrounding the tube 5 from one end of the tube 5 along a rectilinear direction in which the lamp 1 is inserted into the tube 5, and an infrared ray transmitting filter 9 installed at a designated portion of the tube 5 for shielding the lamp 1 from the reflector 7.

The lamp 1 emits infrared rays together with visible rays. The infrared ray transmitting filter 9 is installed at a position of the tube 5 in which rays from the lamp 1 irradiated toward a central portion of the reflector 7 are passed through. That is, among the rays irradiated from the lamp 1 passing through the tube 5 in a vertical direction, only rays irradiated toward the central portion of the reflector 7 pass through the infrared ray transmitting filter 9.

As shown in FIGS. 1 and 2, since the reflector 7 has a parabolic shape centering around the tube 5, rays irradiating from the lamp 1 onto the central portion of the reflector 7 around the tube 5 are reflected by the reflector 7 so that these rays can be irradiated to a comparatively long distance from the car.

In this embodiment, as described above, in order to allow infrared rays emitted from the lamp 1 to be irradiated on the central portion of the reflector so that these rays can be irradiated to a comparatively long distance from the car, the infrared ray transmitting filter 9 is in a ring shape installed at a contact portion between the reflector 7 and the tube 5 so that the tube 5 is surrounded by the infrared ray transmitting filter 9.

FIG. 1 shows a state in which the lamp, 1 is deeply inserted into the tube 5. In this state, rays emitted from the lamp 1 pass through the entire surface of the tube 5, and then are reflected by the central portion of the reflector 7 and other peripheral portions of the reflector 7.

Rays irradiated toward the central portion of the reflector 7 pass through the infrared ray transmitting filter 9, thus including only infrared rays except for visible rays. Accordingly, only the infrared rays are irradiated onto the central portion of the reflector 7, and are then reflected toward an area of a long distance in front of the car.

These infrared rays reflected toward the front portion of the car are reflected by obstacles or objects located in front of the car, the rays are then returned to the infrared ray irradiation apparatus, and then sensed by a camera so that the sensed data of the rays are provided to a driver as data containing information of circumstances in front of the car through an image display equipment such as a head up display.

Rays irradiated toward the peripheral portions of the reflector 7 still include visible rays, thus being reflected by the reflector 7 and irradiated toward an area of a short distance in front of the car. Accordingly, these rays allow the driver to directly sense obstacles located at an area of short distance in front of the car with the naked eye.

When the lamp 1 is separated from the bottom surface of the tube 5 by a designated distance by operating the rectilinear actuator 3 as shown in FIG. 2, rays emitted from the lamp 1 pass through only the infrared ray transmitting filter 9. The rays passing through the infrared ray transmitting filter 9, as described above, are reflected by the central portion of the reflector 7, and irradiated toward an area of a long distance in front of the car, thereby providing data of circumstances in front of the car to the driver through the image display equipment.

Here, only the infrared rays, except for visible rays, are reflected by the reflector 7. Thus, in case the lamp 1 is used together with a separate high beam lamp, the infrared ray irradiation apparatus of the present invention provides the driver with useful traveling information for assisting a driver to secure a long-distance visual field in high-speed driving.

Figure 3:
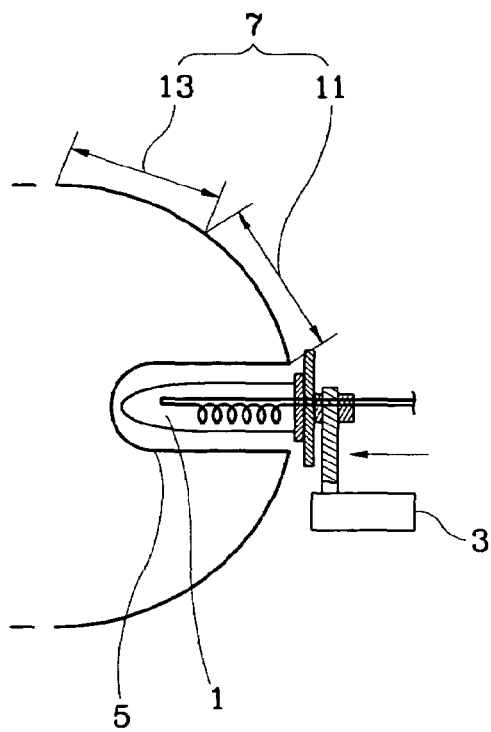
FIG. 3 is a schematic side view of an infrared ray irradiation apparatus in accordance with another embodiment of the present invention.
Figure 4:
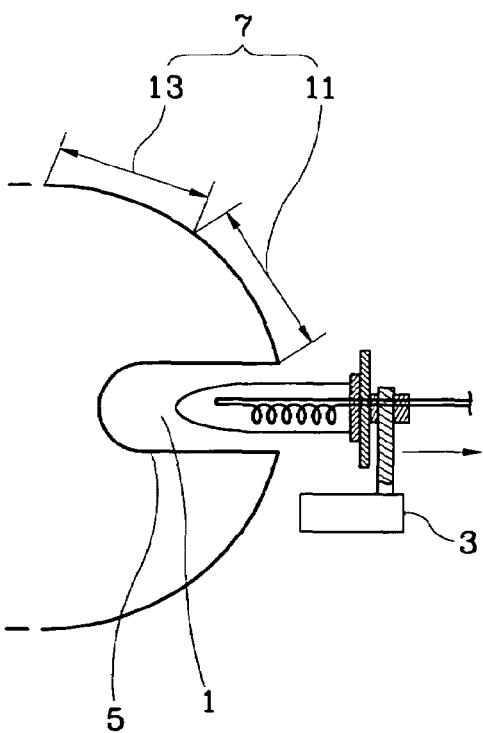
FIG. 4 is a schematic side view illustrating operation of an infrared ray irradiation apparatus in accordance with another embodiment of the present invention.

FIGS. 3 and 4 are schematic views respectively illustrating the constitution and operation of an infrared ray irradiation apparatus in accordance with another embodiment of the present invention. Here, the same elements as those of FIGS. 1 and 2 are denoted by the same reference numerals.

In this embodiment, the infrared ray irradiation apparatus comprises the lamp 1, the rectilinear actuator 3 for rectilinearly moving the lamp 1, the tube 5 made of a transparent material and extending at a designated length for receiving the rectilinearly moving lamp 1, and the reflector 7 surrounding the tube 5 from one end of the tube 5 along a rectilinear direction in which the lamp 1 is inserted into the tube 5.

Here, the reflector 7 includes an infrared ray reflecting filter 1, in which visible rays are passed through and infrared rays are reflected, installed at a designated position. The infrared ray reflecting filter 11 is installed at the central portion of the reflector 7 so that the tube 5 is surrounded by the infrared ray reflecting filter 11.

Accordingly, even in the state that the lamp 1 is deeply inserted into the tube 5 as shown in FIG. 3, rays emitted from the lamp 1 are irradiated onto both the infrared ray reflecting filter 11 located at the central portion of the reflector 7 and the peripheral portion 13 of the reflector, and are then reflected thereby.

Consequently, the infrared ray reflecting filter 11 allows visible rays to pass through and reflects only infrared rays, thereby allowing only the infrared rays to be irradiated toward an area of a long distance in front of the car. Further, the peripheral portion 13 of the reflector 7 reflects visible rays toward an area of a short distance in front of car.

When the lamp 1 is separated from the bottom surface of the tube 5 by a designated distance by operating the rectilinear actuator 3 as shown in FIG. 4, rays emitted from the lamp 1 are irradiated onto only the central portion of the reflector 7, and reflected by the infrared ray reflecting filter 11 under the condition that visible rays are removed from the rays. Thus, only infrared rays are irradiated toward an area of a long distance in front of the car, thereby providing data of circumstances in front of the car to the driver through the camera and the image display equipment.

As apparent from the above description, the present invention provides an infrared ray irradiation apparatus for a night vision system, which is operated easily and selectively in a visible and infrared ray irradiation mode and an infrared ray irradiation mode, and irradiates infrared rays emitted from a lamp toward an area in front of a car by means of one transmission step (by a tube) and one reflection step (by a reflector), thus irradiating infrared rays without deterioration in brightness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An infrared ray irradiation apparatus for a night vision system apparatus, comprising:
    a lamp;
    a rectilinear actuator for rectilinearly moving said lamp;
    a tube made of a transparent material configured to receive said rectilinearly moving lamp; and
    a reflector surrounding the tube from one end of said tube along a rectilinear direction in which said lamp is inserted into said tube,
    wherein said reflector includes an infrared ray reflecting filter installed at a designated position for allowing visible rays to pass through and reflecting infrared rays.

2. The infrared ray irradiation apparatus as set forth in claim 1, wherein said infrared ray reflecting filter is installed at a central portion of said reflector so that said tube is surrounded by said infrared ray reflecting filter.

* * * * *